United States Patent [19]

Huang

[11] Patent Number: 5,732,064
[45] Date of Patent: Mar. 24, 1998

[54] OPTIC DISK DRIVE VIBRATION ABSORBING DEVICE

[75] Inventor: Chien-Yi Huang, Taipei, Taiwan

[73] Assignee: Behavior Tech Computer Corporation

[21] Appl. No.: 754,256

[22] Filed: Nov. 20, 1996

[51] Int. Cl.$^6$ .................................................. G11B 17/04
[52] U.S. Cl. ..................... 369/263; 369/77.1; 369/247; 360/97.02
[58] Field of Search .................... 369/77.1, 75.2, 369/247, 263; 360/97.02, 99.02, 99.06

[56] References Cited

U.S. PATENT DOCUMENTS

| | | | |
|---|---|---|---|
| 4,979,161 | 12/1990 | Verhagen | 369/263 |
| 5,062,099 | 10/1991 | Odawara et al. | 369/263 |
| 5,204,850 | 4/1993 | Obata | 369/75.2 |

*Primary Examiner*—Stuart S. Levy
*Assistant Examiner*—Kevin M. Watkins
*Attorney, Agent, or Firm*—Morton J. Rosenberg; David I. Klein; Jun Y. Lee

[57] ABSTRACT

An optic disk drive includes an outer casing inside of which an inner casing is received to define two side channels between side walls of the outer casing and opposite sides of the inner casing. A disk holding arm is pivoted to and extends above the inner casing to define a spacing therebetween for receiving therein a disk tray which supports an optic disk thereon. The disk tray has two side flanges, each having a step-like configuration, slidably receivable within the side channels between a retracted position and an ejected position. The vibration absorbing device includes a C-shaped resilient member fixed to each of the side walls of the outer casing and having a contact segment extending into the side channel to contact and form a resilient engagement with the step of the disk tray when the disk tray is at the retracted position. The vibration absorbing device also includes an anchoring member provided on a rear side of the disk holding arm to contact and thus engage the disk tray when the disk tray is at the retracted position so that when the disk tray is at the first position, the vibration absorbing device provides a three point contact engagement with the disk tray to tightly hold the disk tray against vibration.

5 Claims, 4 Drawing Sheets

OPTIC DISK DRIVE VIBRATION ABSORBING DEVICE

FIELD OF THE INVENTION

The present invention relates generally to an optic disk drive, particularly the so-called CD-ROM used in computer systems and in particular to a vibration absorbing device for at least partly absorbing and thus reducing the vibration caused by the operation of the motors of the disk drive.

BACKGROUND OF THE INVENTION

Optic disk drives are an important data storage medium which allow a great amount of data to be stored on a single optic disk. For a computer system, such as a personal computer, an optic disk drive, usually referred to as a CD-ROM, is an important peripheral device which accesses a great amount of data in a very time efficient manner. For a multi-media system, the optical disk drive is almost a must. The speed of the CD-ROM is an important factor assessing the performance of the CD-ROM. With the development of the CD-ROM, the speed of the CD-ROM is now increased dramatically from "double speed" to "octuple speed" which is the most prevailing model nowadays. Models of optic disk drives of even higher speed are also available in the market.

Since there is such a great amount of data stored or recorded in a single optic disk, each element of the data occupies only a very limited space on the optic disk to be "read" with a light beam projected to the optic disk by a data transducer located above the optic disk, positional precision of the optic disk relative to the data transducer is a very important factor of the optic disk drive. The higher the operational speed is, the greater precision the optic disk drive needs. For most of the optic disk drives currently available in the market, a first motor is used to rotate the disk and a second motor moves the data transducer in a linear path along a radius of the optic disk for positioning the data transducer at any desired position above the disk. The operation of the motors inevitably causes vibration of the disk drive which deteriorates the positional precision between the data transducer and the optic disk.

Further, the optic disk drive currently available in the market uses a sliding tray to support and move the optic disk in and out of the disk drive. The sliding movement of the disk tray is guided by two opposite guide slots. The sliding engagement between the guide slots and the disk tray has a clearance to allow a smooth and low resistant sliding movement of the disk tray. This clearance, however, makes it impossible to precisely hold the disk tray and thus the optic disk supported thereon in position when the motors are operating and causing vibration on the disk tray. This limits the development of higher speed models of the optic disk drives.

It is therefore desirable to provide a vibration absorbing device to be incorporated within an optic disk drive to reduce the problem caused by the vibration imposed thereon by the operation thereof.

SUMMARY OF THE INVENTION

It is an object of the present invention to provide a vibration absorbing device to be incorporated within an optic disk drive for reducing the problem caused by vibration imposed on the disk drive during the operation thereof so as to increases the positional precision that can be achieved in the optic disk drive.

It is another object of the present invention to provide a vibration absorbing device to be incorporated within an optic disk drive which comprises disk tray holders to reduce the adverse effect in positional precision caused by the clearance between the disk tray and the guide slots that slidably receive the disk tray therein so as to provide a better positional precision of the disk tray within the optic disk drive.

It a further object of the present invention to provide a vibration absorbing device to be incorporated within an optic disk drive which comprises an anchoring element fixed inside the optic disk drive to provide a resilient contact engagement with the disk tray when the disk tray is received within the optic disk drive so as to reduce the vibration of the disk tray and thus allow a data transducer that reads data from the optic disk to be more precisely located at the desired position above the disk.

It is yet a further object of the present invention to provide a vibration absorbing device which can be readily incorporated into an optic disk drive that is currently existing without significant modification of the optic disk drive and with a very limited cost.

To achieve the above objects, in accordance with the present invention, there is provided a vibration absorbing device for use in an optic disk drive comprising an outer casing inside of which an inner casing is received to define two side channels between side walls of the outer casing and opposite sides of the inner casing, a disk holding arm pivoted to and extending above the inner casing to define a spacing therebetween for receiving therein a disk tray which supports an optic disk thereon and comprises two side flanges, each having a step-like configuration, slidably receivable within the side channels between a retracted position and an ejected position. The vibration absorbing device comprises a C-shaped resilient member fixed to each of the side walls of the outer casing and having a contact segment extending into the side channel to contact and form a resilient engagement with the step of the disk tray when the disk tray is at the retracted position. The vibration absorbing device further comprises an anchoring member provided on a rear side of the disk holding arm to contact and thus engage the disk tray when the disk tray is at the retracted position so that when the disk tray is at the first position, the vibration absorbing device provides a three point contact engagement with the disk tray to tightly hold the disk tray against vibration.

The features and advantages of the present invention will be readily understood from the following description of a preferred embodiment, reference being had to the attached drawings, wherein:

DETAILED DESCRIPTION OF THE PREFERRED EMBODIMENT

Figure 1:
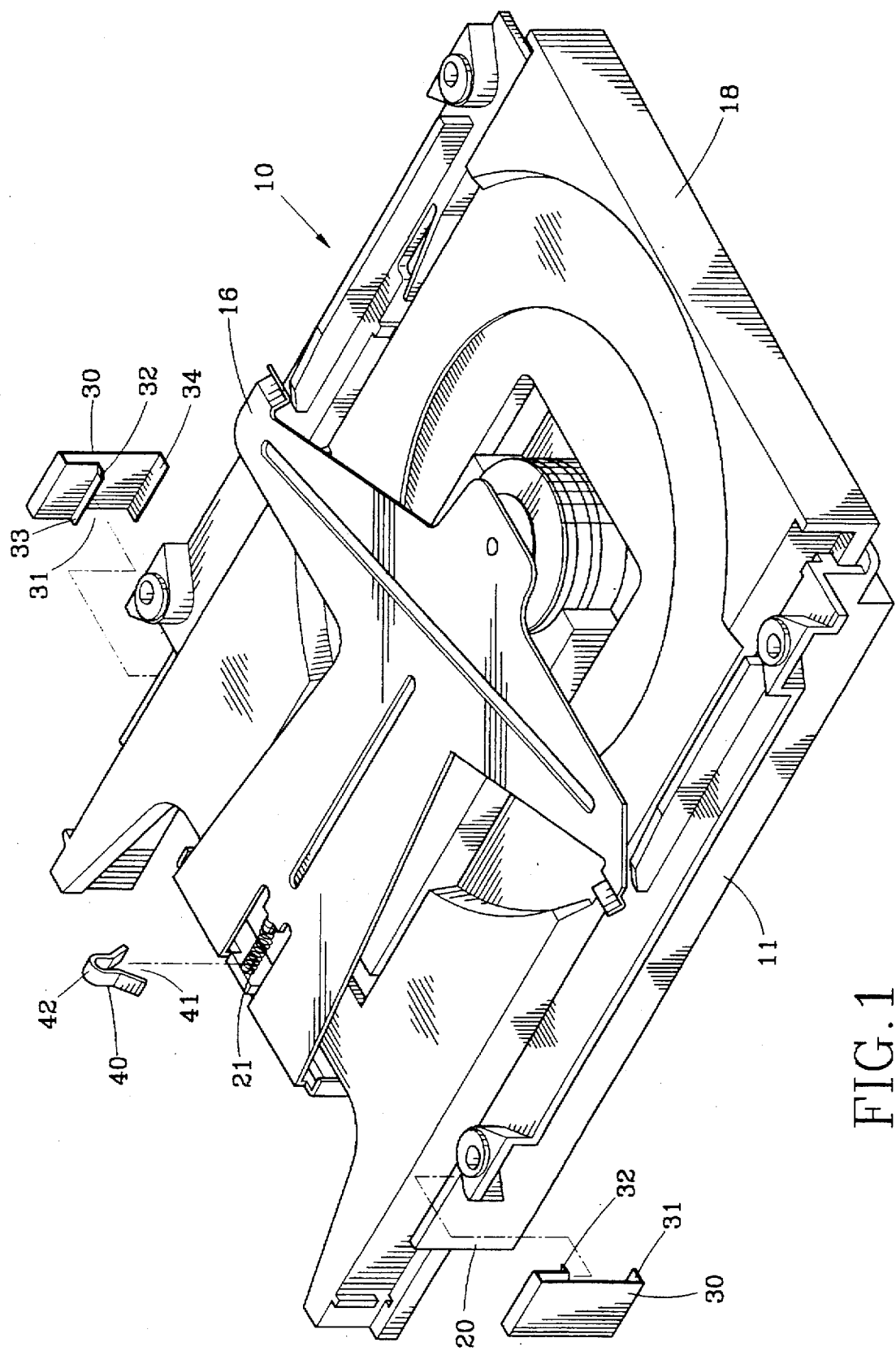
FIG. 1 is a perspective view showing an optic disk drive and vibration absorbing elements comprised of a vibration absorbing device in accordance with the present invention which are shown detached from the optic disk drive.

With reference to the drawings and in particular to FIG. 1, wherein an optic disk drive, generally designated at 10, together with vibration absorbing means in accordance with the present invention to be incorporated into the optic disk drive 10, is shown, the optic disk drive 10, as is usually known, comprises an outer casing 11 defined by a bottom with two opposite side walls and a rear wall, the top and front side being open (see FIG. 2), inside of which an inner casing 12 is received to define a side channel between each of two opposite sides of the inner casing 12 and the associated side wall of the outer casing 11. The side walls of the outer casing 11 have a guide slot 25 formed thereon and inside the outer casing 11 to be substantially opposite to each other.

A disk holding arm 16, in the form of a cantilever, is pivoted to a rear edge of the inner casing 12 and extending above the inner casing 12 from the rear edge of the inner casing 12 toward substantially midway between the rear edge and an opposite front edge of the inner casing 12 so as define a spacing between the inner casing 12 and the disk holding arm 16, which spacing is open toward the front edge of the inner casing 12 and large enough to receive, from the front edge of the inner casing 12, a disk tray 18 to be further discussed.

The rear edge of the disk holding arm 16 is provided with biasing means, such as a helical spring 21, which has one end fixed to the rear edge of the disk holding arm 16 and an opposite second end fit over and thus fixed to a peg 22 (see FIG. 2) provided on the rear edge of the inner casing 12 and extending toward the front edge thereof. The helical spring 21 provides a biasing force between the disk holding arm 16 and the inner casing 12.

Figure 3:
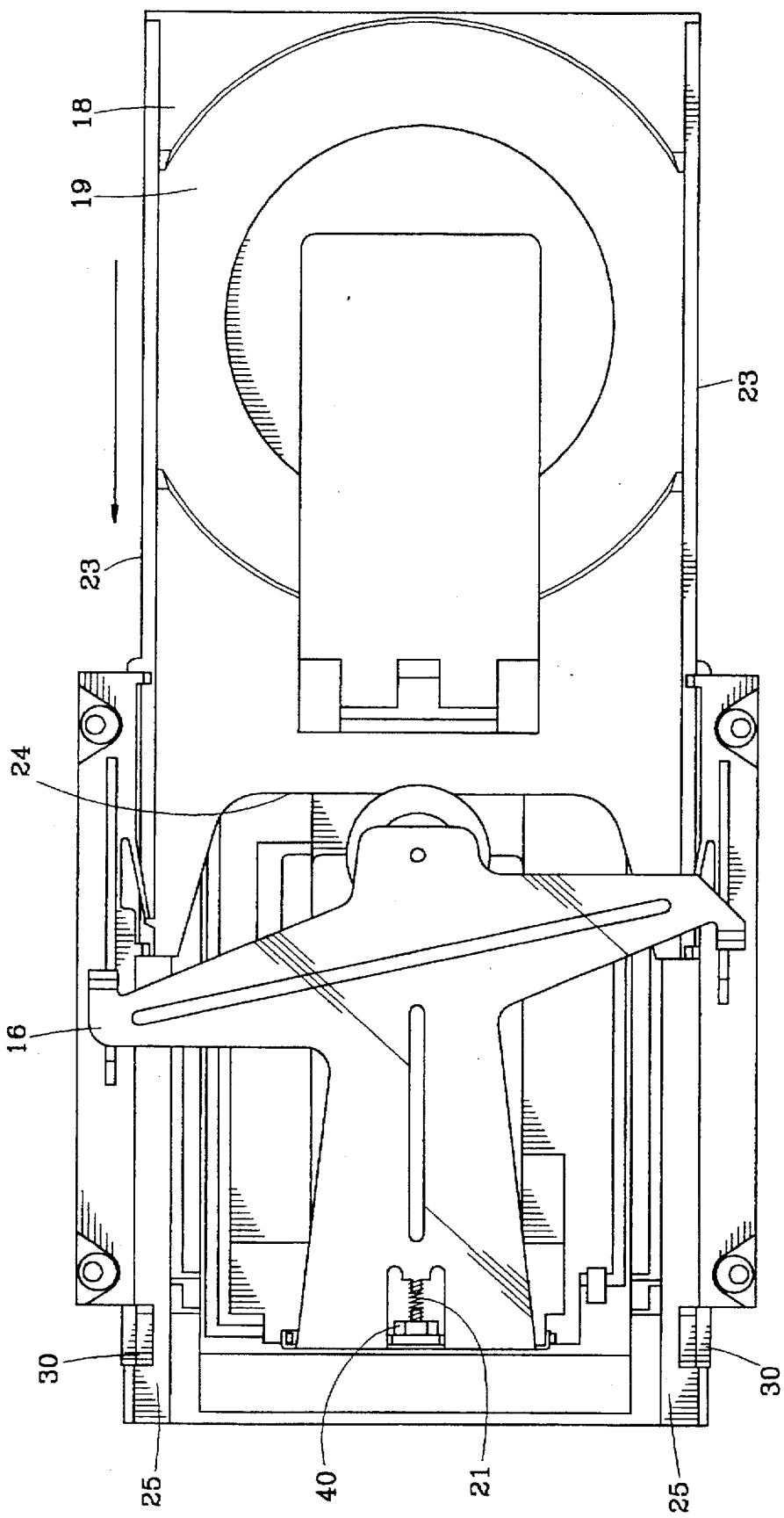
FIG. 3 is a top plan view showing the optic disk drive with the vibration absorbing device mounted thereon, wherein the disk tray is in the ejected position where the disk tray is located outside the disk drive.
Figure 4:
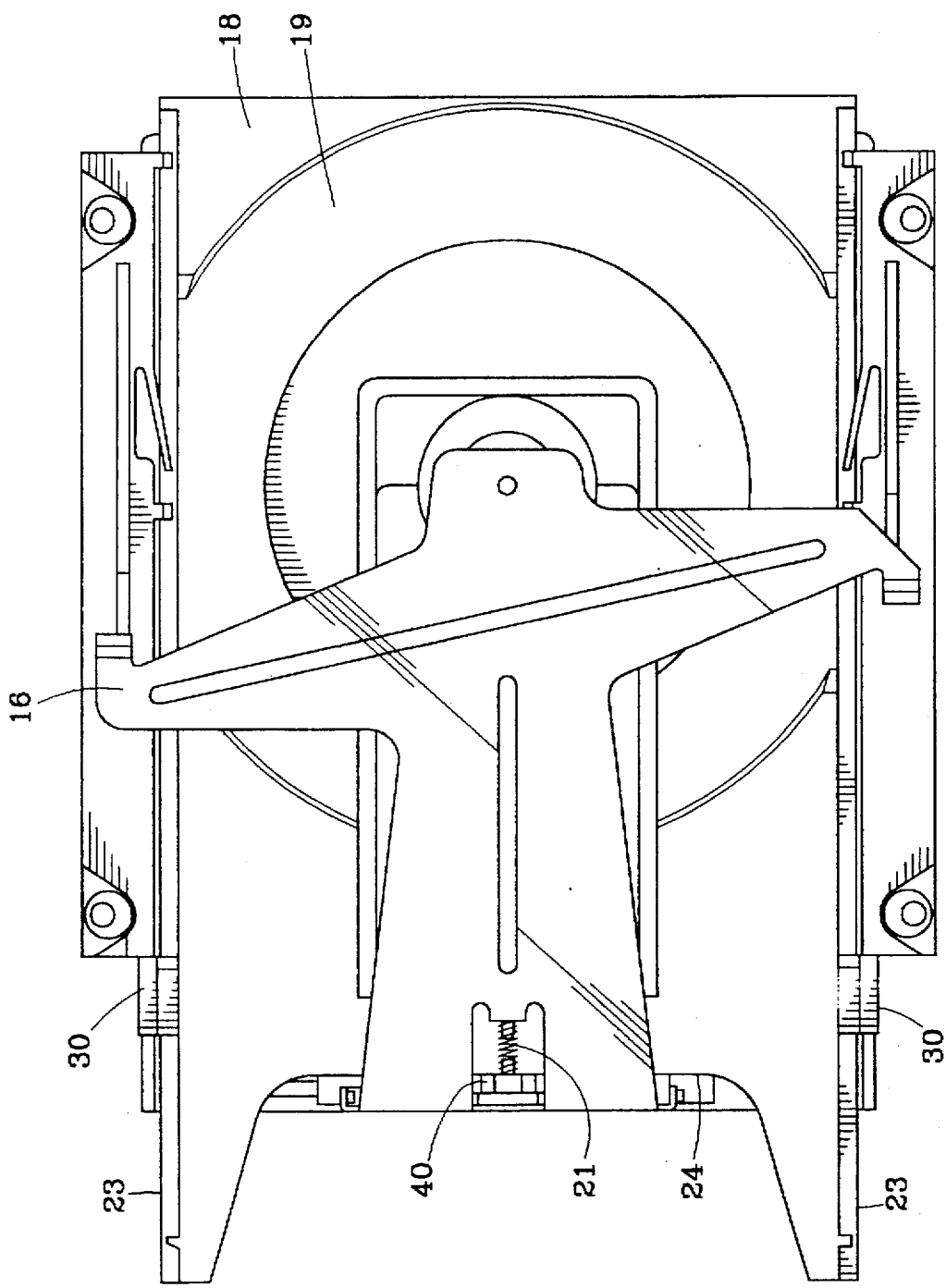
FIG. 4 is a top plan view, similar to FIG. 3, but showing the disk tray in the retracted position where the disk tray is completely received within the disk drive.

The disk tray 18 comprises a flat tray body with two opposite side flanges 23 slidably received within the side channels defined between the sides of the inner casing 12 and the side walls of the outer casing 11 with the flat tray body received between the spacing between the disk holding arm 16 and the inner casing 12. The disk tray 18 is actuateable to move relative to the inner casing 12 between a retracted position where the disk tray 18 is completely received within the spacing between the disk holding arm 16 and the inner casing 12, as shown in FIG. 4, and an ejected position where the disk tray 18 is located outside the outer casing 11, as shown in FIG. 3.

Each of the side flanges 23 comprises a step configuration to be slidably receivable within and guided by the guide slots 25 formed on the side walls of the outer casing 1. That arrangement guides the sliding movement of the disk tray 18 between the inner casing 12 and the disk holding arm 16.

Figure 2:
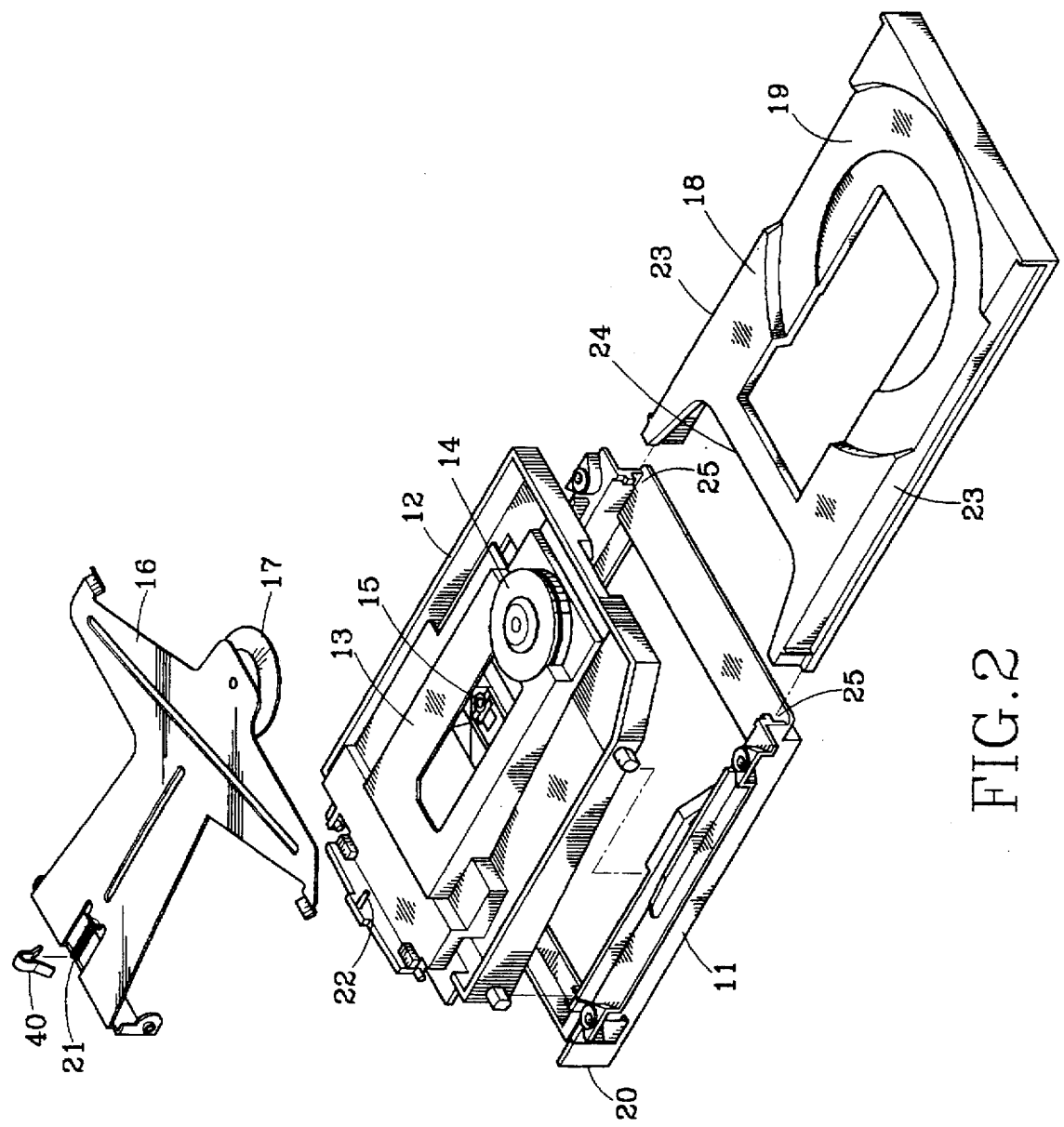
FIG. 2 is an exploded perspective view showing the optic disk drive and the vibration absorbing device shown in FIG. 1.

The disk tray 18 comprises a recess 19, preferably a circular recess, inside which an optic disk (not shown) which is usually a circular disk, is receivable. The movement of the disk tray 18 to the retracted position between the disk holding arm 16 and the inner casing 12 brings the optic disk into the optic disk drive 10 to such a location to be "read" by a data transducer 15 (FIG. 2).

The inner casing 12 comprises a driving unit 13 located therein. A disk driving wheel 14 is provided on the inner casing 12 and driven by a first motor (not shown) located inside the driving unit 13 to rotate about a rotational axis. The disk driving wheel 14 is arranged to receive the optic disk thereon when the disk tray 18 is located at the retracted position. Opposite to the disk driving wheel 14, a disk holding wheel 17 is provided on the disk holding arm 16 to be freely rotatable relative thereto. The disk holding wheel 17 is provided to engage and thus hold the optic disk against the disk driving wheel 14 so that the rotation of the disk driving wheel 14 by the first motor causes the optic disk to rotate and thus allowing the optic disk to be "swept" by the data transducer 15 along a circumferential path on the optic disk.

The data transducer 15 is provided within the driving unit 13 to be driven a second motor (not shown) also located inside the inner casing 12 to exercise linear movement along a radial direction of the optic disk. This allows the data transducer 15 to be positioned at different radial location with respect to the optic disk.

The combination of linear movement of the data transducer 15 in the radial direction of the optic disk and the rotation of the optic disk by the disk driving wheel 14 allows the data transducer 15 to be positionable at any desired location above the optic data for accessing the data stored thereon.

As mentioned above, the operation of the motors that drive the disk driving wheel 14 and radially moves the data transducer 15 induces vibration of the disk tray 18 of the optic disk drive. Such a vibration has to be minimized to provide the optic disk drive with better positional precision of the disk tray 18 and thus a better performance of the optic disk drive.

Also, to allow a relative moment of low resistance between the disk tray 18 and the outer and inner casings 11 and 12, a sufficient clearance has to exist in the slidable engagement between the steps of the side flanges 23 of the disk tray 18 and the guide slots 25 of the outer casing 11. This, when acted upon by the vibration caused by the motors, causes instability in precisely positioning the disk tray 18 in the optic disk drive. The combination of the vibration caused by the motor and the position instability induced by the clearance in the sliding engagement between the disk tray 18 and the outer casing 11 deteriorates the positional precision between the optic disk and disk tray 18.

Thus, in accordance with the present invention, the optic disk drive is provided with a vibration absorbing device which more securely holds the disk tray 18 and thus the optic disk in position within the optic disk drive. The vibration absorbing device comprises a resilient member 30 substantially in the form of a C shape defining an opening 31 to fit over each of the side walls of the outer casing 11 with a bottom section 34 underlapping the side wall and a top extension 33 inserted into the side channel defined by the side wall of the outer casing 11 and the respect side of the inner casing 12. The top extension 33 comprises a contact segment having a first portion with a flat face substantially parallel with and engageable with the step of the side flange 23 of the disk tray 18 to provide a surface contact engagement therebetween. The member 30 is made of such a material that the C-shaped configuration thereof provides a resiliency that applies a spring force on the step of the side flange 23 of the disk tray via the flat face of the contact segment of top extension 33 that engages the step.

The spring force applied on the disk tray 18 by the resilient members 30 effectively overcomes the problem caused by the clearance between the steps of the side flanges 23 of the disk tray 18 and the guide slots 25. To avoid interference with the sliding movement of the disk tray 18 in and out of the optic disk drive, the resilient members 30 are located close to the rear edge of the inner casing 12 so that the steps of the side flanges 23 of the disk tray 18 are not engaged by the resilient members 30 until the disk tray 18 reaches the retracted position.

To provide a smooth engagement of the resilient members 30 with the steps of the side flanges 23 of the disk tray 18, the contact segment of the top extension 33 of each of the resilient members 30 is provided with an inclined portion 32 facing the inward movement of the disk tray 18 which defines a camming face for guiding the step of the side flange 23 to move underneath the segment of the top extension 33 and thus acting upon by the spring force provided by the resilient member 30.

In accordance with the present invention, the vibration absorbing device further comprises a disk tray anchoring member 40, preferably made of an elastically deformable material, which comprises a C-shaped section 42 to fit over and thus be retained on the portion of the helical spring 21 that is fit over the peg 22 provided on the rear edge of the inner casing 12 and having two diverging legs extending therefrom to define a wide opening 41. The diverging opening 41 allows the anchoring member 40 to be readily fit over the peg 22 and allows the two legs to be in contact engagement with and preferably elastically deformed by a rear edge 24 of the disk tray 18 when the disk tray 18 is moved to and at the retracted position where the rear edge 24 thereof is located under the anchoring member 40. A force is applied to the rear edge 24 of the disk tray 18 when the disk tray 18 is at the retracted position to tightly hold the disk tray 18 and thus reduces the vibration that may be caused on the disk tray 18 by the operation of the motors.

Thus, in the retracted position of the disk tray 18, the two resilient members 30 and the anchoring member 40 are all applying a force on the disk tray 18. The three members 30 and 40 provide the disk tray 18 with a three point contact engagement which forms a non-floating support and thus securely holds the disk tray 18 in position against the vibration caused by the motors.

It should be noted that the vibration absorbing device discussed above does not require extra space inside the optic disk drive and also needs no substantial modification of the existing construction of the optic disk drive so that it can provide an effective anchoring of the optic disk in position with a very limited cost.

The above description is made with respect to a preferred embodiment of the present invention and for those skilled in the art, it is possible to made modifications and changes to the above-described embodiment without departing from the scope and spirit of the present invention. All these modifications and changes should be considered within the scope of the present invention as defined in the appended claims.

What is claimed is:

1. A vibration absorbing device adapted to be used in an optic disk drive comprising an outer casing inside of which an inner casing is received to define two side channels between opposite side walls of the outer casing and between opposite side walls of the inner casing, a disk holding arm pivoted to the inner casing and extending above the inner casing to define a spacing therebetween and a disk tray comprising a flat disk holder adapted to receive and hold thereon an optic disk and two side flanges extending from the disk holder to be slidably receivable within the side channels and thereby movable between a first position where the disk tray is received within the optic disk drive and located between the disk holding arm and the inner casing and a second position where the disk tray is located outside the optic disk drive, the vibration absorbing device including a resilient member fixed to each of the side walls of the outer casing and having a contact segment located inside the respective side channel to contact and form a resilient engagement with the respective side flange of the disk tray when the disk tray is at the first position and an anchoring member provided on a rear side of the disk holding arm to contact and thus engage the disk tray when the disk tray is at the first position so that when the disk tray is at the first position, the vibration absorbing device providing a three point contact engagement with the disk tray to tightly hold the disk tray against vibration, each side flange of the disk tray having a step-like configuration, the resilient member including a C-shaped body fit over each of the side walls of the outer casing, a top extension provided on the C-shaped body to extend into the respective side channel to have the contact segment that is provided on the top extension located inside the side channel and in resilient contact engagement with the step-like configuration of the respective flange of the disk tray.

2. The vibration absorbing device as claimed in claim 1, wherein the contact segment of the resilient member comprises a section having a flat face substantially parallel with the step-like configuration to form a surface contact engagement therewith.

3. The vibration absorbing device as claimed in claim 2, wherein the top segment further comprises an inclined section to guide the step-like configuration to move underneath the flat face of the section that is parallel with the step-like configuration when the disk tray is moved from the second position toward the first position.

4. A vibration absorbing device adapted to be used in an optic disk drive comprising an outer casing inside of which an inner casing is received to define two side channels between opposite side walls of the outer casing and between opposite side walls of the inner casing, a disk holding arm pivoted to the inner casing and extending above the inner casing to define a spacing therebetween and a disk tray comprising a flat disk holder adapted to receive and hold thereon an optic disk and two side flanges extending from the disk holder to be slidably receivable within the side channels and thereby movable between a first position where the disk tray is received within the optic disk drive and located between the disk holding arm and the inner casing and a second position where the disk tray is located outside the optic disk drive, the vibration absorbing device including a resilient member fixed to each of the side walls of the outer casing and having a contact segment located inside the respective side channel to contact and form a resilient engagement with the respective side flange of the disk tray when the disk tray is at the first position and an anchoring member provided on a rear side of the disk holding arm to contact and thus engage the disk tray when the disk tray is at the first position so that when the disk tray is at the first position, the vibration absorbing device providing a three point contact engagement with the disk tray to tightly hold the disk tray against vibration, the anchoring member including a head portion to attach to the disk holding arm, and two legs extending from the head portion toward the disk tray, the legs being arranged to diverge away from each other to stably contact and hold the disk tray in position when the disk tray is at the first position.

5. The vibration absorbing device as claimed in claim 4, wherein the disk holding arm has a helical spring fixed to a rear edge thereof, the spring having an end fit over and fixed to a peg provided on a rear wall of the inner casing and wherein the head portion of the anchoring member comprises a C-shaped configuration to fit over the portion of the helical spring that is fit over the peg.

* * * * *